Dec. 26, 1944.   P. B. MERCÉ   2,366,122
STEERING OF MOTOR VEHICLES OR ANY OTHER KIND OF VEHICLES
Filed Aug. 11, 1942   3 Sheets-Sheet 1
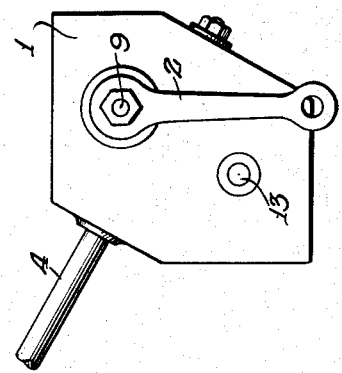
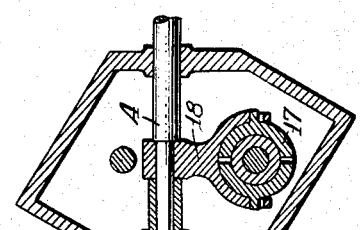
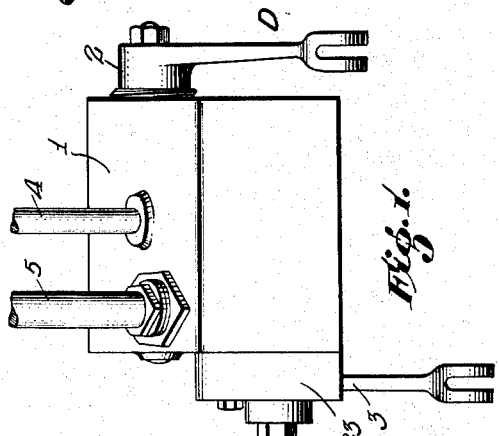
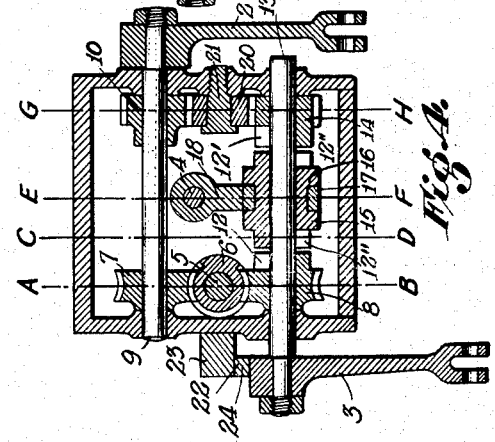
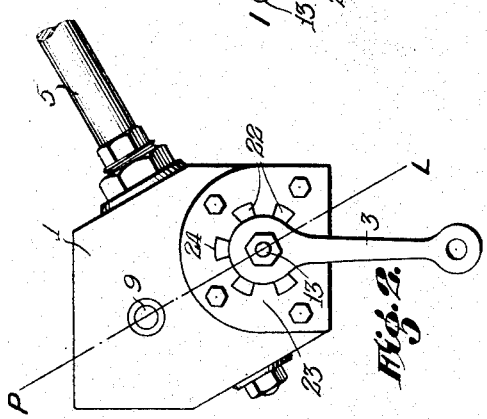
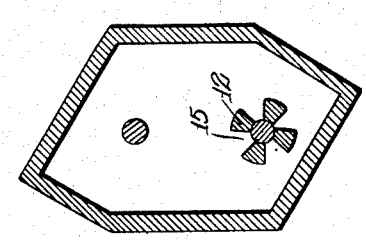
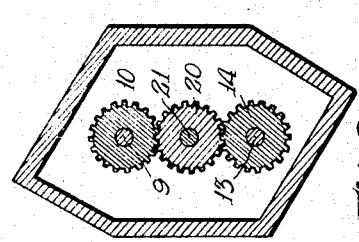
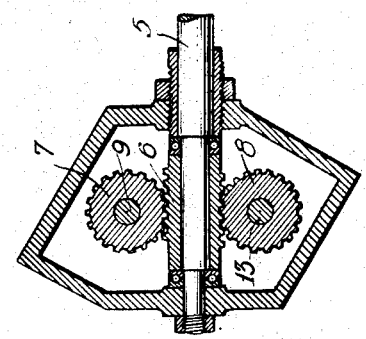
Inventor:
Pascual Barrios Mercé,
by [signature]
Attorney.

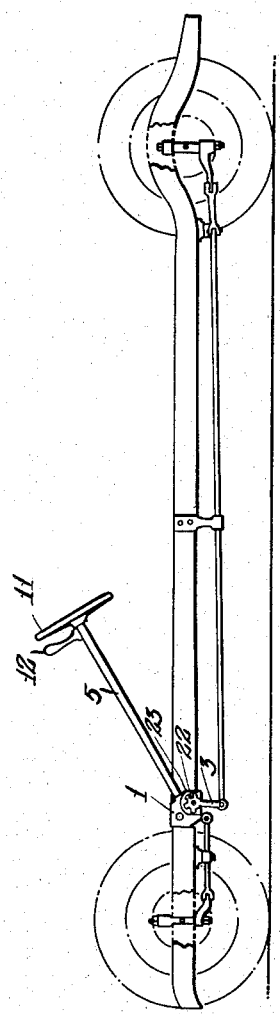
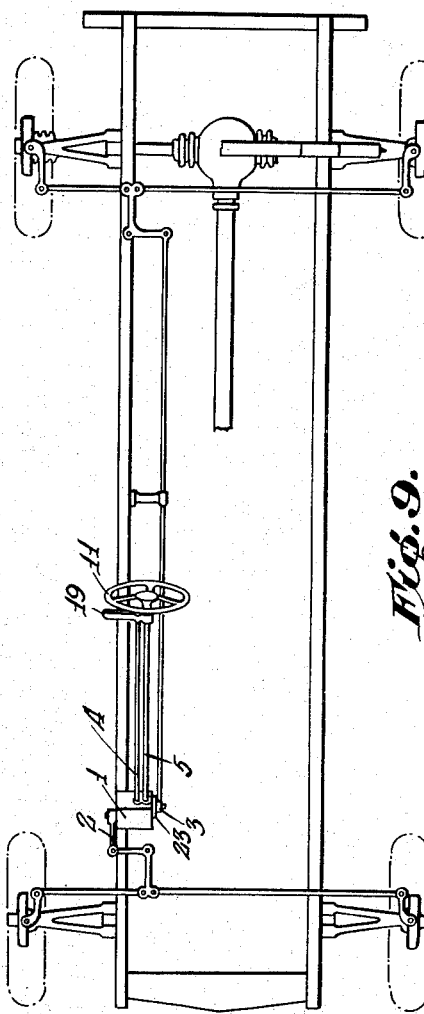
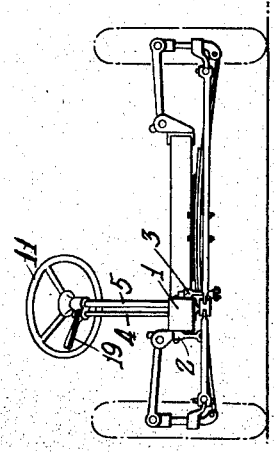

Dec. 26, 1944. P. B. MERCÉ 2,366,122
STEERING OF MOTOR VEHICLES OR ANY OTHER KIND OF VEHICLES
Filed Aug. 11, 1942 3 Sheets-Sheet 3

Inventor:
Pascual Barrios Mercé,
by E. F. Wuduroth
Attorney.

Patented Dec. 26, 1944

2,366,122

UNITED STATES PATENT OFFICE 2,366,122

STEERING OF MOTOR VEHICLES OR ANY OTHER KIND OF VEHICLES

Pascual Barrios Mercé, Montevideo, Uruguay

Application August 11, 1942, Serial No. 454,448

2 Claims. (Cl. 74—498)

The present invention refers to new and useful improvements in the steering of motor vehicles or any other kind of vehicles.

The steering of vehicles based on the principle of simultaneous and parallel deviation of the front wheels has been known heretofore.

My invention is based on an entirely new principle, the principle of the simultaneous and parallel deviation of the four wheels and the simultaneous but contrary deviation of the front and rear wheels.

My invention also provides the means or device for carrying into practice this new principle, which improves and facilitates the steering of vehicles.

The means I have devised for this purpose comprises a steering gear case provided with two steering arms and other parts which, while allowing the steering of vehicles in the usual and known manner, i. e., the simultaneous and parallel deviation of the two front wheels, it permits:

First, the simultaneous or parallel deviation of the front and rear wheels, and

Second, the simultaneous but inverse deviation of the front and rear wheels, which makes the taking of curves by and the parking of vehicles easier and safer.

The simple enunciation of my principle for the steering of vehicles and the description of my device for carrying my principle into practice, all of which permits the movements not known heretofore in vehicles, is sufficient, for those versed in the art, to exactly appreciate the importance of my invention.

In order that my invention may be easily understood and carried into practice, I have illustrated it in the accompanying drawings, in which Fig. 1 is a front view in elevation of my steering gear case showing the two steering arms and the direction rod adjacent to the steering post.

Fig. 2 is a view in elevation of the left end of the steering gear case showing the rear wheel steering arm with its coupling teeth.

Fig. 3 is a view in elevation of the right end of the steering gear case showing the front wheel steering arm.

Fig. 4 is a longitudinal section in elevation on the line P—L of Fig. 2.

Fig. 5 is a cross section in elevation on the line A—B of Fig. 4.

Fig. 6 is a cross section in elevation on the line C—D of Fig. 4.

Fig. 7 is a cross section in elevation on the line E—F of Fig. 4.

Fig. 8 is a cross section in elevation on the line G—H of Fig. 4.

Fig. 9 is a plan view of the vehicle frame showing the steering gear case and its connecting parts to the front and rear wheels.

Fig. 10 is a side view in elevation of Fig. 9.

Fig. 11 is a front view in elevation of Fig. 9.

Fig. 12 is a rear view in elevation of Fig. 9.

In all these figures the same number of reference indicates the same part.

Figure 15:
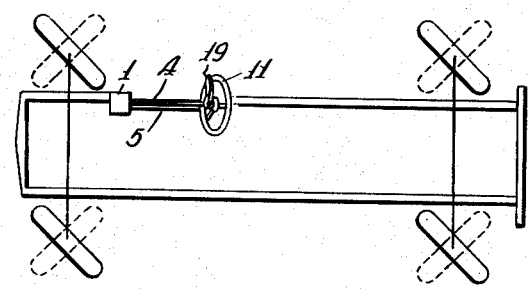
Fig. 15 is a plan view of the frame showing the direction rod for simultaneously deviating both the front and rear wheels in the same direction, or parallel.
Figure 14:
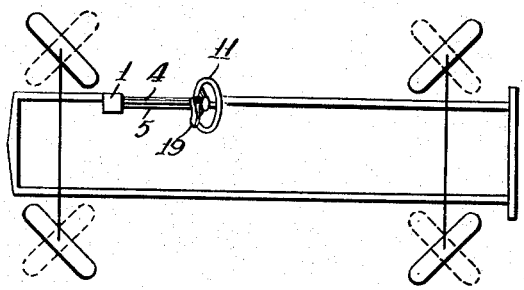
Fig. 14 is a plan view of the frame showing the direction rod for simultaneously deviating both the front and rear wheels in inverse direction.
Figure 13:
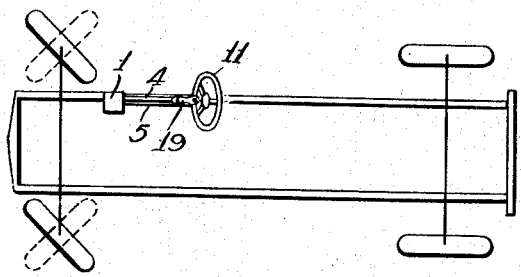
Fig. 13 is a plan view of the frame showing the direction rod for deviating the front wheels while the rear wheels are in normal position.

My device for carrying into practice my new principle in the steering of vehicles comprises a steering gear case 1 which has a steering arm 2 for the front wheels, a steering arm 3 for the rear wheels, and a direction rod 4 adjacent to steering post 5.

Steering post 5 is provided with a worm 6 which engages gears 7 and 8.

Gear 7 is securely mounted on countershaft 9 which carries gear 10 and steering arm 2 so that when it is made to revolve by means of steering wheel 11 of steering post 5 to the right or to the left the steering arm 2 moves correspondingly backwards or forward.

Gear 8 is provided with lateral coupling teeth 12 and is freely mounted on countershaft 13 on which is also mounted gear 14 with lateral coupling teeth 12', and a coupling bushing 15 with corresponding coupling teeth 12" at both ends.

Bushing 15 is securely mounted on countershaft 13 and has a groove 16 which engages a collar 17 which is operated by a fork 18 at the end of direction rod 4.

Direction rod 4 is provided at its upper end with a lever 19 and at its lower end, inside steering gear case 1, with the aforementioned fork 18 with the collar 17 which engages groove 16 of bushing 15. By means of lever 19 which operates direction rod 4 it is possible to longitudinally change the position of bushing 15 and countershaft 13 so that when bushing 15 engages gear 8 by means of teeth 12 and 12" steering arms 2 and 3 move in opposite directions and when bushing 15 engages gear 14 by means of teeth 12' and 12" steering arms 2 and 3 move in the same direction.

Gear 14 is freely mounted on countershaft 13 and engages transmission gear 20, freely mounted on axle 21 securely fixed on case 1, which in turn engages gear 10 securely mounted on countershaft 9.

Rear wheel steering arm 3 is provided with teeth 22 which engage corresponding grooves 24 in piece 23 fixed to steering gear case 1, so that when that part of the device formed by bushing 15, countershaft 13 and steering arm 3 is in a neutral position or disengaged, steering arm 3 is securely held by teeth 22 and corresponding grooves 24, so that when steering post is operated it will only operate steering arm 2, and consequently only the front wheels will have a directional movement.

From the foregoing it will be gathered that the means I have devised and made known in the foregoing specification permits carrying my new principle into practice, i. e., the principle of the simultaneous or parallel deviation or movement of the front and rear wheels of a vehicle, or the simultaneous but contrary or inverse deviation of the front and rear wheels of the vehicle.

It is understood that the means or device above referred to may be subject to constructional changes without departing from the scope of the invention as made known in the following claims.

I claim:

1. In a device of the character described, a casing, a countershaft extending thereacross and journaled in the walls thereof, a motion-transmitting arm secured to said countershaft, a slidable countershaft extending across said casing in spaced parallel relation to said first countershaft, said slidable countershaft also being journaled in said casing walls, a motion-transmitting arm secured to said slidable countershaft, and means for selectively actuating said countershafts and their respective motion-transmitting arms to simultaneously rotate both shafts in the same direction, to simultaneously rotate both shafts in opposite directions and to rotate said first countershaft alone in either direction; said means comprising a gear fixed to said first countershaft adjacent one end thereof, a gear loosely mounted on the corresponding end of said slidable countershaft, a manually operable actuating member in engagement with said gears, a gear fixed to said first countershaft adjacent the other end thereof, a corresponding gear loosely mounted on the other end of said slidable shaft, an intermediate freely-rotatable gear intermediate said last two gears and in simultaneous engagement therewith, and manually operable clutch means secured to said slidable shaft and selectively engageable with the gears on the latter shaft.

2. In a device of the character described, a casing, a countershaft extending thereacross and journaled in the walls thereof, a motion-transmitting arm secured to said countershaft, a slidable countershaft extending across said casing in spaced parallel relation to said first countershaft, said slidable countershaft also being journaled in said casing walls, a motion-transmitting arm secured to said slidable countershaft, and means for selectively actuating said countershafts and their respective motion-transmitting arms to simultaneously rotate both shafts in the same direction, to simultaneously rotate both shafts in opposite directions and to rotate said first countershaft alone in either direction; said means comprising a gear fixed to said first countershaft adjacent one end thereof, a gear loosely mounted on the corresponding end of said slidable countershaft, a manually operable actuating member having a worm in engagement with said gears, a gear fixed to said first countershaft adjacent the other end thereof, a corresponding gear loosely mounted on the other end of said slidable shaft, an intermediate freely-rotatable gear intermediate said last two gears and in simultaneous engagement therewith, and manually operable clutch means secured to said slidable shaft and selectively engageable with the gears on the latter shaft, and means for retaining said slidable shaft and its arm against rotation when said clutch means is disengaged from the gears on said slidable shaft.

PASCUAL BARRIOS MERCÉ.